(12) United States Patent
Burns et al.

(10) Patent No.: US 7,943,558 B2
(45) Date of Patent: *May 17, 2011

(54) LUBRICANT WITH NON-TERMINAL FUNCTIONAL GROUPS

(75) Inventors: John Martin Burns, San Jose, CA (US); Malika D. Carter, San Jose, CA (US); Xing-Cai Guo, Tracy, CA (US); Bruno Marchon, Palo Alto, CA (US); Robert Waltman, Gilroy, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/653,780

(22) Filed: Dec. 14, 2009

(65) Prior Publication Data

US 2010/0103557 A1 Apr. 29, 2010

Related U.S. Application Data

(63) Continuation of application No. 11/224,920, filed on Sep. 12, 2005, now Pat. No. 7,683,012.

(51) Int. Cl.
*C10M 171/00* (2006.01)
*G11B 5/84* (2006.01)
*G11B 5/706* (2006.01)

(52) U.S. Cl. ........ 508/110; 508/583; 428/810; 428/833; 428/834; 428/848

(58) Field of Classification Search .................. 508/110, 508/583; 428/810, 833, 834, 848
See application file for complete search history.

(56) References Cited

U.S. PATENT DOCUMENTS

| 6,288,014 B1 * | 9/2001 | Falcone ......................... 508/469 |
| 2002/0183211 A1 * | 12/2002 | Akada et al. .................. 508/422 |

* cited by examiner

*Primary Examiner* — Glenn A Caldarola
*Assistant Examiner* — Taiwo Oladapo
(74) *Attorney, Agent, or Firm* — Darren Gold

(57) ABSTRACT

Lubricant with non-terminal functional groups. The location of the functional groups minimizes free chain length and molecular weight of a lubricant while simultaneously maximizing evaporation temperature. The locations of the functional groups to the backbone of the molecule of the lubricant allows for shorter lengths of free backbone length between functional groups attached to a lubricated surface. The lubricant lubricates mechanical devices including hard disk drives.

24 Claims, 9 Drawing Sheets

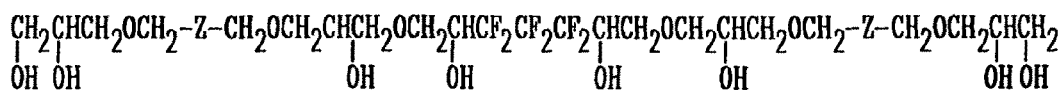
FIG. 3(a)   $-Z- = -CF_2O-[(CF_2CF_2O)_m-(CF_2O)_n]-CF_2-$
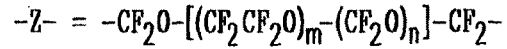
FIG. 3(b)   $-Z- = -CF_2O-[(CF_2CF_2O)_m-(CF_2O)_n]-CF_2-$
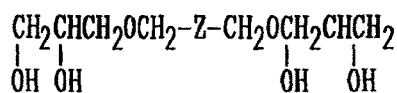
FIG. 10(a)
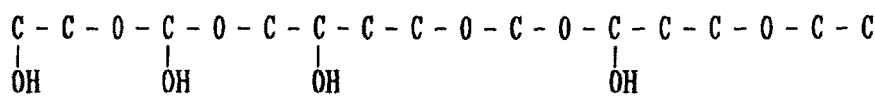
FIG. 10(b)
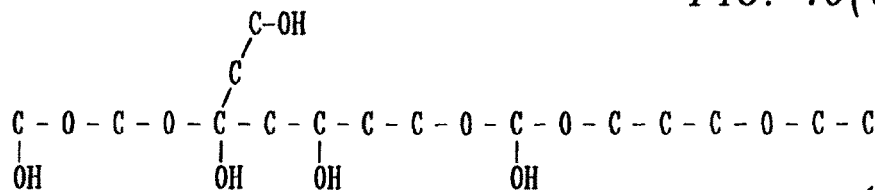
FIG. 10(c)
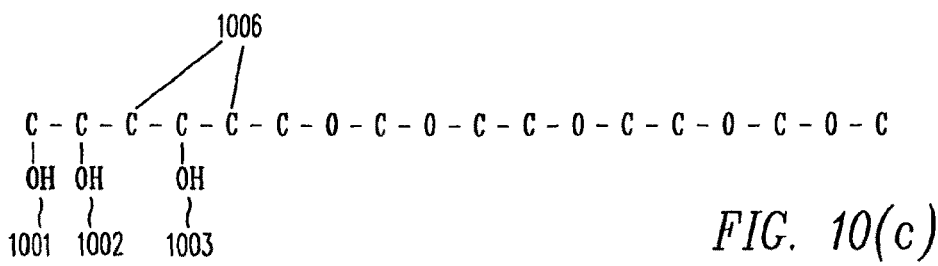
FIG. 10(d)
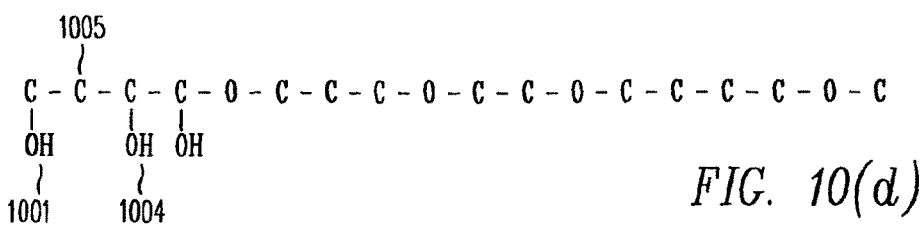

US 7,943,558 B2

LUBRICANT WITH NON-TERMINAL FUNCTIONAL GROUPS

RELATED APPLICATIONS

This non-provisional patent application is a continuation of application Ser. No. 11/224,920 filed Sep. 12, 2005 now U.S. Pat. No. 7,683,012 issued on Mar. 23, 2010, which is incorporated herein by reference.

BACKGROUND

Disk lubricants use linear chain molecules made of a perfluoropolyether (PFPE) backbone, with a terminal functional group attached at both ends of the backbone. These lubricants are typically known as boundary lubricants. Boundary lubricants form a lubricating film when the functional groups of the lubricant attach to a surface being lubricated. Boundary lubricants, among other advantages, prevent solid to solid contact. If the backbone in a boundary lubricant molecule is long, the molecule tends to be heavier. A longer, heavier molecule provides the advantage of less evaporation while simultaneously providing the disadvantage of increasing free backbone length. On the other hand, if the molecule's backbone is short, the molecule tends to be lighter. A shorter, lighter molecule provides the advantage of lowering free backbone length while simultaneously providing the disadvantage of allowing greater evaporability. Lubricants, such as boundary lubricants, are used in many types of mechanical devices including disk drives and micro electronic mechanical systems. These devices typically include a moving part which is lubricated to prevent ware. The moving part moves relative to other parts of the device.

One problem that potentially arises with long molecular chains tethered on both ends by terminal functional groups attached to a substrate is that they still have multiple degrees of freedom that allow the middle of the chain to lift up from the disk surface (free backbone length), creating potential head/disk clearance issues. As a result, higher molecular weight lubricants, which would be preferred in a pure evaporation (Marchon, Karis, Dai, and Pit, IEEE Trans. Magn., vol. 39(5), pp. 2447. 2003) and dewetting (Waltman, Khurshudov and Tyndall, Tribology Letters, vol. 12, pp. 163, 2002) are detrimental to the overall head disk spacing margin (Khurshudov and Waltman, Tribology Letters, vol. 11, pp. 143, 2001). Hence, lowering molecular weight (MW) to get better clearance margin is only feasible to a certain point, as evaporation from the disk surface becomes increasingly problematic. In addition to these issues, decreased flying height tends to induce more severe slider/lubricant interactions (moguls, ripples, depletion), and as a result, there is a general trend towards higher lubricant-disk surface interactions as measured by lubricant bonding. Finally, in terms of total head/disk spacing, the lubricant thickness which used to be a negligible part of the budget can no longer be ignored. There is need for a robust lubricant system with a thickness in the 0.5-1.0 nm range. Prior to the invention, lubricant thicknesses were in 1.0-1.3 nm range.

Further, the article, *Tribology Challenges for Head-Disk Interface Toward* 1 *Tb/in²* by Jing Gui (IEEE Transactions on Magnetics, Vol. 39, No. 2, March 2003), describes a Zdol as well as a Z lubricant. These lubricants are configured on a substrate in either a loop or train configuration respectively. However, these lubricants effectiveness are limited by use of terminal functional groups located at the ends of the lubricant backbone.

SUMMARY OF INVENTION

The invention is a new disk lubricant that solves the trade off problem between free backbone length and evaporation of the prior art lubricants. The lubricant of the invention is both high molecular weight and low in free backbone length. FIG. 1(a) shows two short chain lubricant molecules of the prior art with a backbone 101 and functional groups 102 attached to a surface 103. The functional groups 102 are terminal functional groups as they are at the end of the lubricant molecule. The short chain lubricant has good clearance properties since its free backbone length is low. However, the short chain lubricant also easily evaporates. FIG. 1(b) shows a long chain lubricant of the prior art. Due to its molecular weight, the long chain lubricant does not easily evaporate. However, the long chain lubricant's free backbone length demands more clearance for a slider to perform properly. FIG. 1(c) shows an exemplary lubricant molecule of the present invention. The lubricant includes a long chain molecule and therefore does not evaporate easily. Additionally, since it includes multiple functional groups, including non-terminal functional group 104, the spacing between functional groups in the molecule may be reduced to allow for good slider clearance and less free backbone length. Additionally, the multiple functional groups in the lubricant of the present invention increase the adhesion to a disk surface. The points of surface anchoring by the functional groups are shown, for example, by functional groups 102 attaching to the surface of the disk 103 in FIG. 1(a). The lubricant may also be used for other mechanical devices with movable parts, not only hard disk drives.

BRIEF DESCRIPTION OF THE FIGURES

FIG. 3(a) is a diagram showing the molecular structure of Z-tetraol Multidentate (ZTMD).

FIG. 3(b) is a diagram showing the molecular structure of Z-Tetraol.

FIGS. 10(a)-(d) are exemplary molecules.

DETAILED DESCRIPTION

Figure 1A:
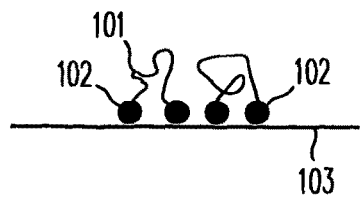
FIG. 1(a) is two short chain, low molecular weight (MW) lubricant molecules with good clearance properties and high evaporation.

The following description is of the best embodiments presently contemplated for carrying out this invention. This description is made for the purpose of illustrating the general principles of this invention and is not meant to limit the inventive concepts claimed herein.

Lubricants are typically comprised of a main chain (backbone) with two attached terminal functional groups. The backbone of a lubricant is the portion of the lubricant which does not typically bind to a substrate. An example of a backbone is perfluoropolyether (PFPE). For purposes of the invention, a lubricant structure may also include two or more backbones attached at an anchor point or a plurality of anchor points. The terminal functional group attached at each end of the lubricant molecule attaches the lubricant to the surface it is lubricating. A functional group for the backbone of a lubricant provides strong interactions with a lubricated surface. Examples of functional groups are OH, piperonyl and carboxylic acid. Functional groups may be attached at the non-end portion of the backbone (non-terminal functional group) or end portions of the backbone (terminal functional group) of a lubricant molecule. A functional group is a terminal functional group if:

1) it is attached to an end of a backbone; or
2) all carbon, oxygen, nitrogen or other linker elements of the backbone attach a functional group between it and one end of the lubricant molecule.

The functional groups attach to a surface of a disk by polar interactions. Functional groups generally include the properties of adhering to a surface.

FIG. 10(a) is a molecule with a single backbone and four OH functional groups. Two of the functional groups are terminal while the other two are non-terminal. FIG. 10(b) is a molecule with two backbones and five functional groups.

Two of the functional groups are terminal while the other three are non-terminal.

FIG. 10(c) is a molecule with a backbone and three functional groups. Functional group 1001 is a terminal functional group since it is at the end of a backbone. Functional group 1002 is also a terminal functional group because it is attached to a carbon which is attached to a carbon that is attached to a terminal functional group 1001. Functional group 1003 is a non-terminal functional group as the carbons 1006 that the carbon attached to functional group 1003 is attached to are not on the ends and do not attach a terminal functional group.

FIG. 10(d) is a molecule with a backbone and three functional groups. Functional group 1001 is a terminal functional group since it is at the end of a backbone. Functional group 1004 is a non-terminal functional group because it is not on an end and the carbon it is attached to is attached to carbons (such as carbon 1005) which do not attach a terminal functional group.

Free backbone length or free chain length is the length of the backbone between two adjacent functional groups. When free backbone lengths are shorter, the height the backbone reaches above a surface is generally less.

Figure 2:
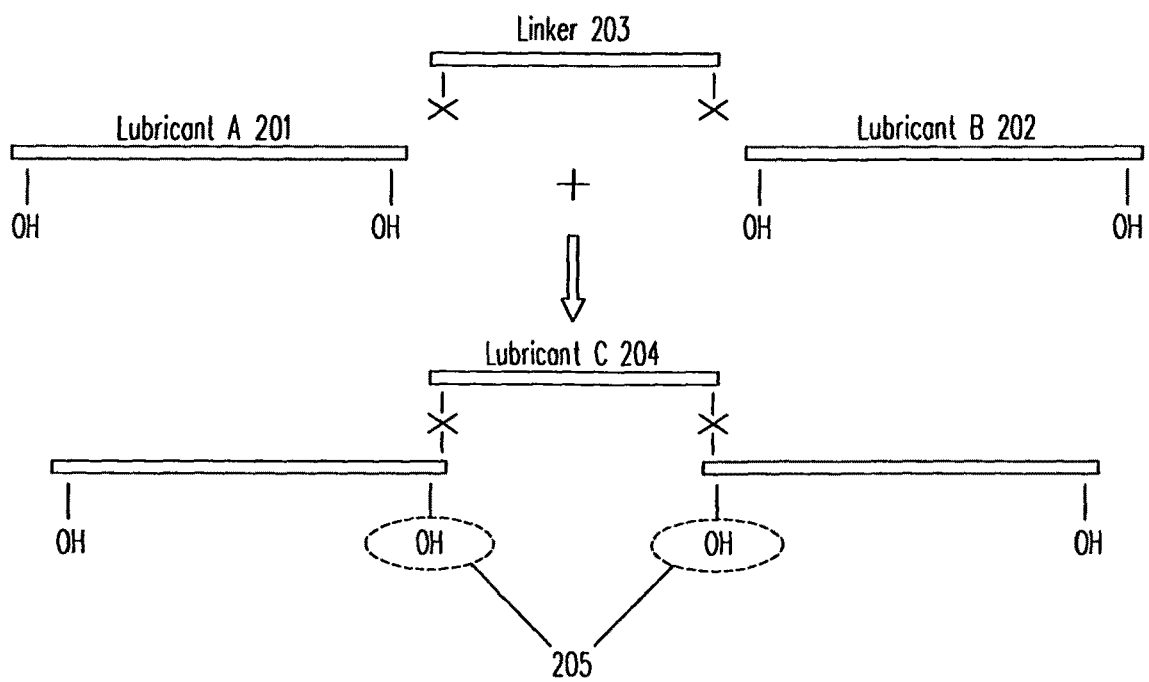
FIG. 2 is a diagram of steps to make an embodiment of a lubricant with low evaporation and good clearance properties.

FIG. 2 shows the steps to create an embodiment of this invention. Two lubricants, lubricant A 201 and lubricant B 202, are put in solution with linker 203.

The lubricants may include terminal functional groups, such as OH, at each end of a molecule of the lubricant. The linker 203 may include a reactive group at each end (denoted by X in FIG. 2). When put into solution, the linker 203 binds to two lubricant molecules 201, 202 to form lubricant molecule 204. The lubricant 204 includes two non-terminal OH functional groups 205. The lubricants A 201 and B 202 may both be Z-Tetraol 1000. FIG. 3(b) is a diagram of the molecular structure of Z-Tetraol 1000. The linker reactant in a reaction with Z-Tetraol preferably attaches itself between two short chain Z-Tetraol 1000 lubricant molecules to form Z-tetraol Multidentate (ZTMD). ZTMD includes a total of four hydroxyl non-terminal functional groups. These four non-terminal functional groups add to the two hydroxyl terminal functional groups already located on each end of the two Z-Tetraol 1000 chains incorporated into the ZTMD molecule. Therefore, the ZTMD molecule includes a total of eight functional groups (four non-terminal). The molecular weight of ZTMD is slightly greater than 2000 (two 1000 amu chain, plus the linker). FIG. 3(a) is a molecular diagram of ZTMD. Of course the reaction between the linker and the lubricant may continue creating lubricants with more than two of the original lubricant components tethered together in a variety of configurations.

If Z-Tetraol 1900 were used in the reaction described above, then the resulting lubricant molecule would have a molecular weight of less than 4000. The linker plus two Z-Tetraol molecules together have a molecular weight of less than 4000. One method of tailoring the weight of the resulting lubricant molecule is to change the weight of the original lubricant molecule used in the reaction that combines two lubricant molecules with a linker molecule.

Figure 9A:
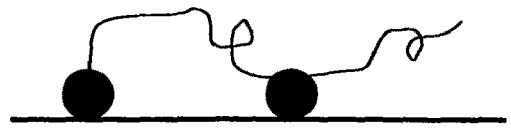
FIGS. 9(a)-(f) are diagrams of lubricants of the present invention.

Other embodiments of the invention include lubricants shown in FIGS. 9(a)-9(f). FIG. 9(a) shows an embodiment of a lubricant molecule of the invention with two functional groups. One of the functional groups is a non-terminal functional group while the other is a terminal functional group.

Figure 9B:
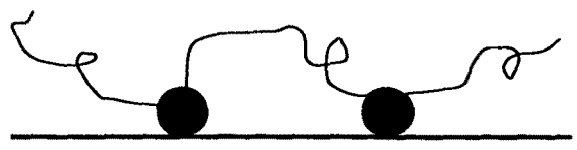

FIG. 9(b) shows an embodiment of the invention with two functional groups. Both of these functional groups are non-terminal functional groups.

Figure 9C:
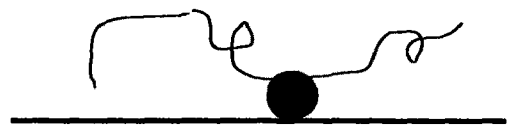

FIG. 9(c) shows an embodiment of the invention with one functional group. The one functional group is a non-terminal functional group.

Figure 9D:
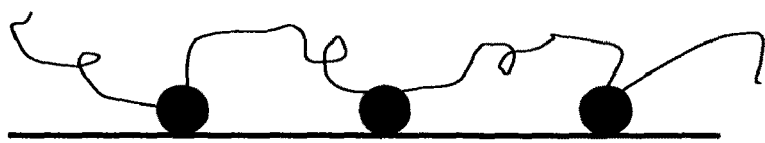

FIG. 9(d) shows an embodiment of the invention with three functional groups. All three of the functional groups are non-terminal functional groups.

Figure 9E:
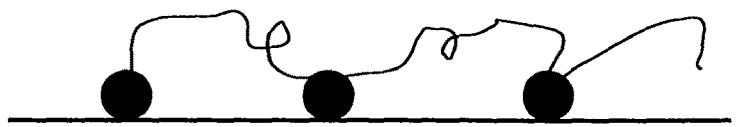

FIG. 9(e) shows an additional embodiment of the invention with three functional groups. Two of the three functional groups are non-terminal-functional groups. The third functional group is a terminal functional group.

Figure 9F:
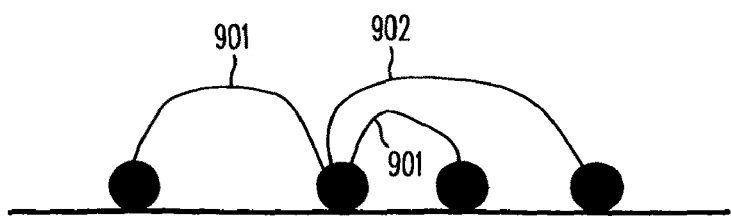

FIG. 9(f) shows an embodiment of the invention with four functional groups. Three of the functional groups are terminal functional groups. The last functional group is a non-terminal functional group. Also, this lubricant includes backbone 901 and an attached a second backbone 902.

The embodiments of lubricants of FIGS. 9(a)-9(f) provide the advantages of a higher weight and less free backbone length than lubricants with only terminal functional groups.

Figure 4A:
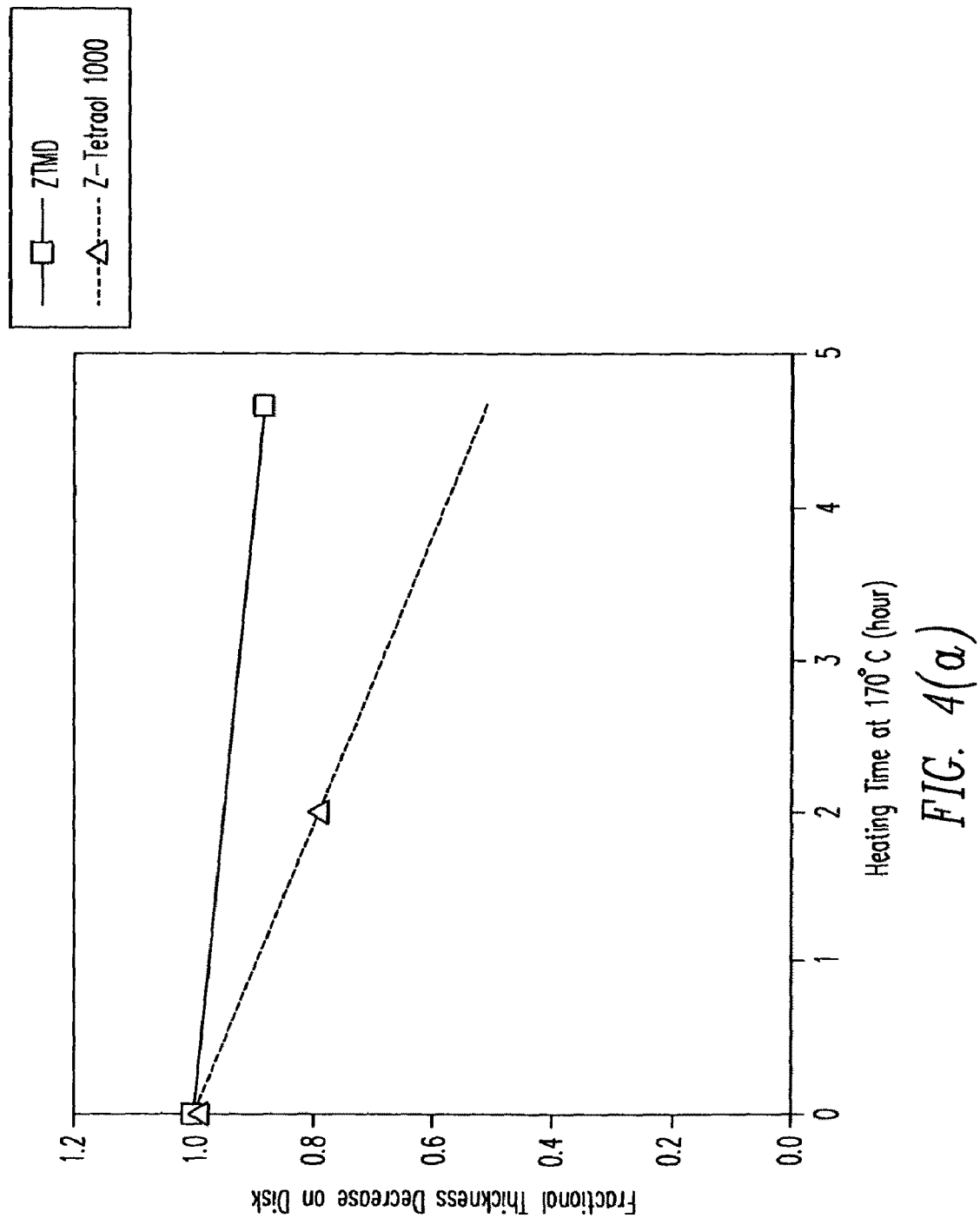
FIG. 4(a) is a graph of the thickness of ZTMD and Z-Tetraol 1000 on a disk after heating.

FIG. 4(a) compares the fractional thickness decrease of both ZTMD and Z-Tetraol 1000 on a heated disk. Identical disks were coated with one of ZTMD and Z-Tetraol 1000. The measurements of fractional decrease were taken by infrared spectroscopy. The data shows that after five hours of heating at 170° C. the disk coated with ZTMD retained over 90% of its original lubricant. On the other hand, the disk coated with the prior art Z-Tetraol 1000 retained under 60% of its original lubricant. This demonstrates the high level of bonding and low levels of evaporation supplied by ZTMD.

Figure 4B:
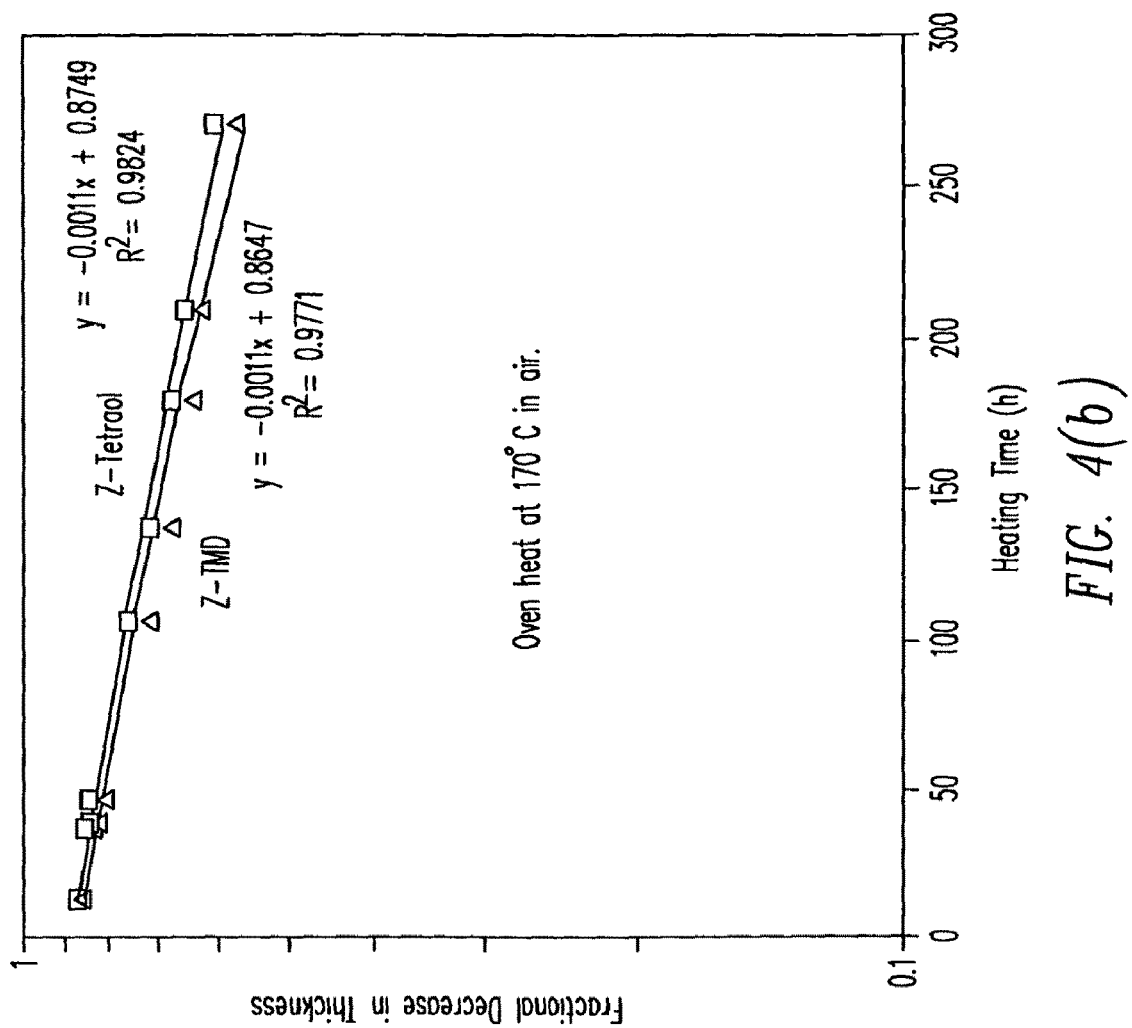
FIG. 4(b) is a graph of the thickness of ZTMD and Z-Tetraol 2000 on a disk after heating.

FIG. 4(b) on the other hand compares fractional thickness decrease of both ZTMD and Z-Tetraol 2000 on a heated disk. Identical disks were coated with one of ZTMD and Z-Tetraol 2000. The measurements of fractional decrease were taken by infrared spectroscopy. The data shows that after five hours of heating at 170° C. both disks coated with ZTMD retained over 90% of their original lubricant. Thus, ZTMD maintains good evaporation properties while simultaneously keeping free chain lengths short.

Figure 5:
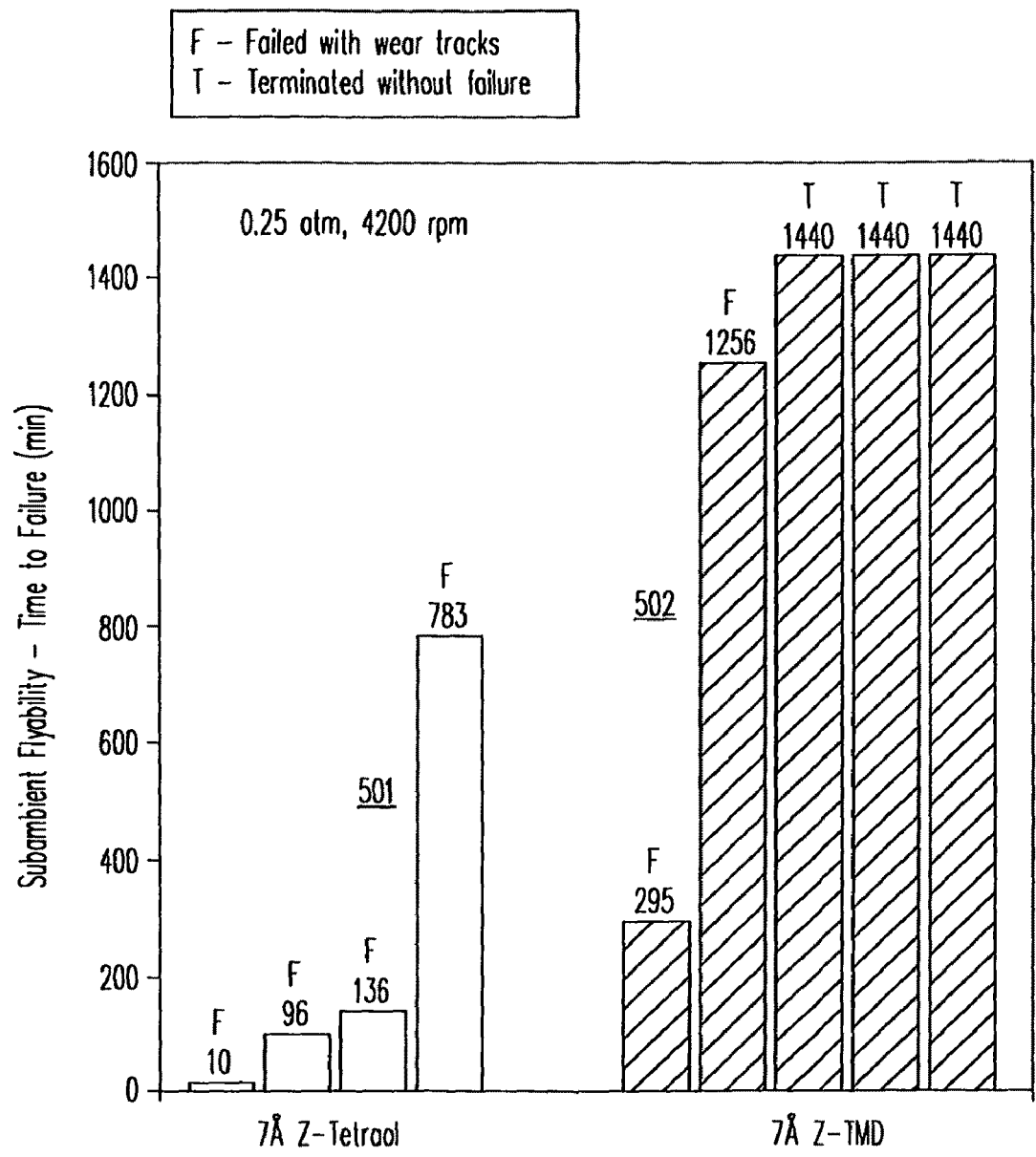
FIG. 5 is a chart showing sub-ambient flyability results of ZTMD, compared with Z-Tetraol 2000.

FIG. 5 shows sub-ambient flyability results of ZTMD 7 Å thickness, compared with Z-Tetraol 2000. At 7 Å, ZTMD clearly outperforms Z-Tetraol 2000, demonstrating a very robust interface. Each of bars 501 represent the results of a flyability test on a disk lubricated with Z-Tetraol 2000. Each of bars 502 represent the results of a flyability test on a disk lubricated with ZTMD. The flyability test included flying a head over the surface of a disk, at 0.25 atmospheres of pressure and 4200 rpm, lubricated with either of the lubricants. The results shown are the time to failure of the head. The results 501 showed that the four Z-Tetraol 2000 tests averaged about 4-5 hours before failure. On the other hand, results 502 showed that three of five tests with the ZTMD lubricant ended without failure in the test time frame of 24 hours.

Figure 6:
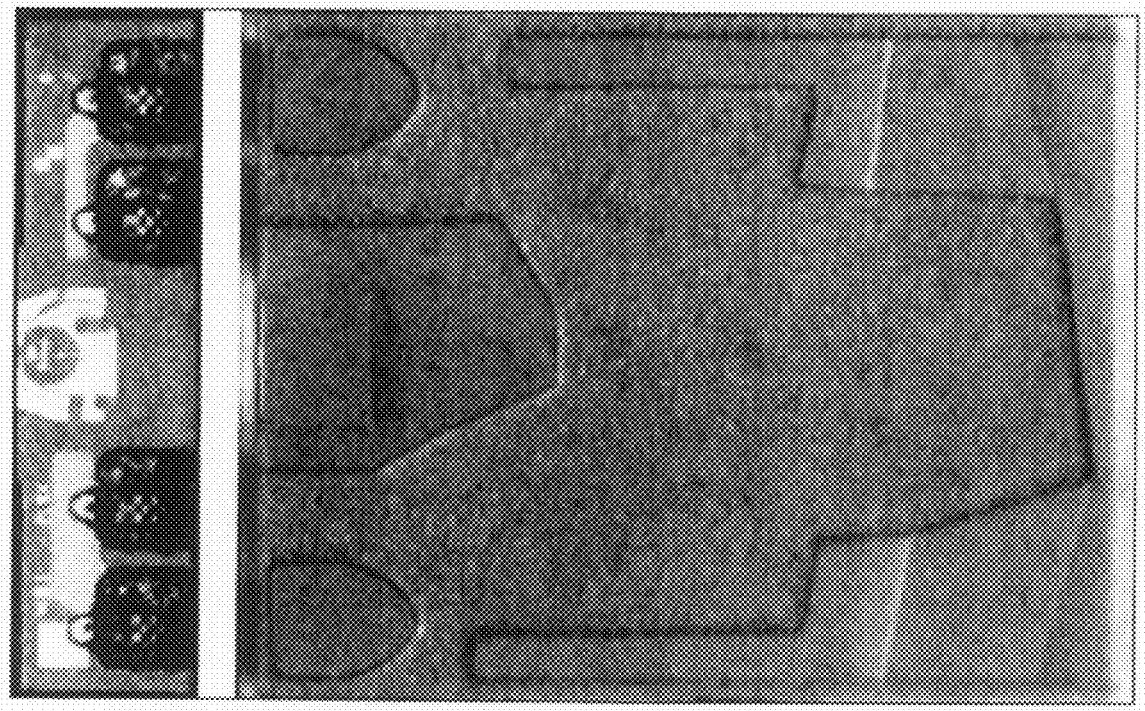
FIG. 6 is a picture of a slider after flying on a disk with a lubricant of the invention.
Figure 7:
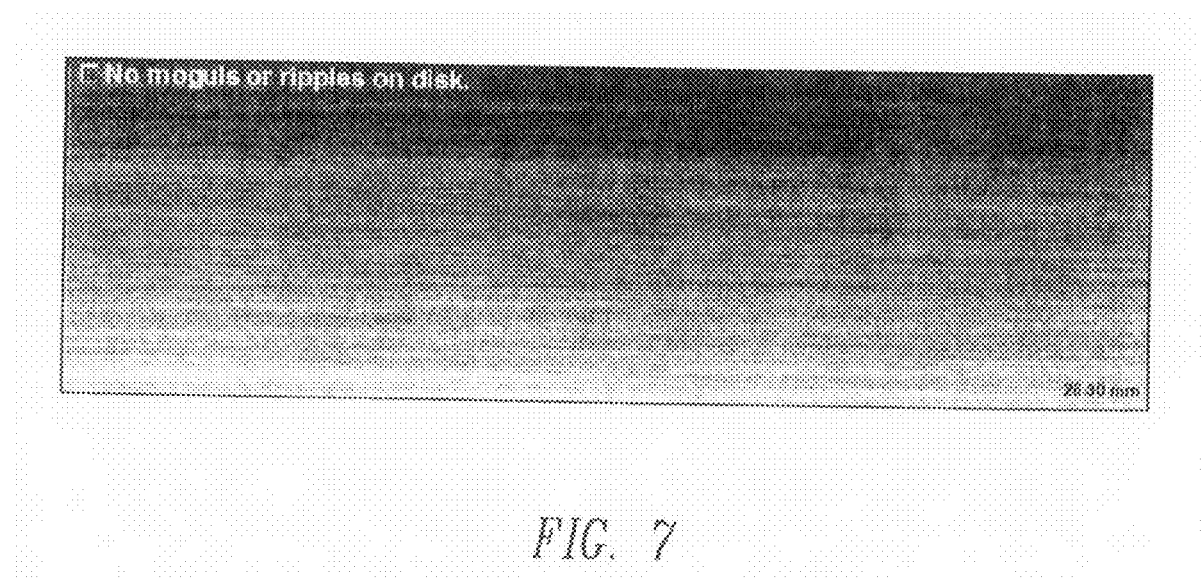
FIG. 7 is an image of a disk at 26-30 mm after a slider flying on a disk with a lubricant of the invention.

FIG. 6 is a picture of a slider after being used in conjunction with a disk lubricated with ZTMD. The slider does not include any lube pickup or smears. Thus, the lubricant is able to work in conjunction with a hard disk drive system. FIG. 7 is a picture of a track on a used disk lubricated with ZTMD at a resolution of 26-30 mm. After use, the disk does not exhibit lube moguls or lube depletions.

Figure 8A:
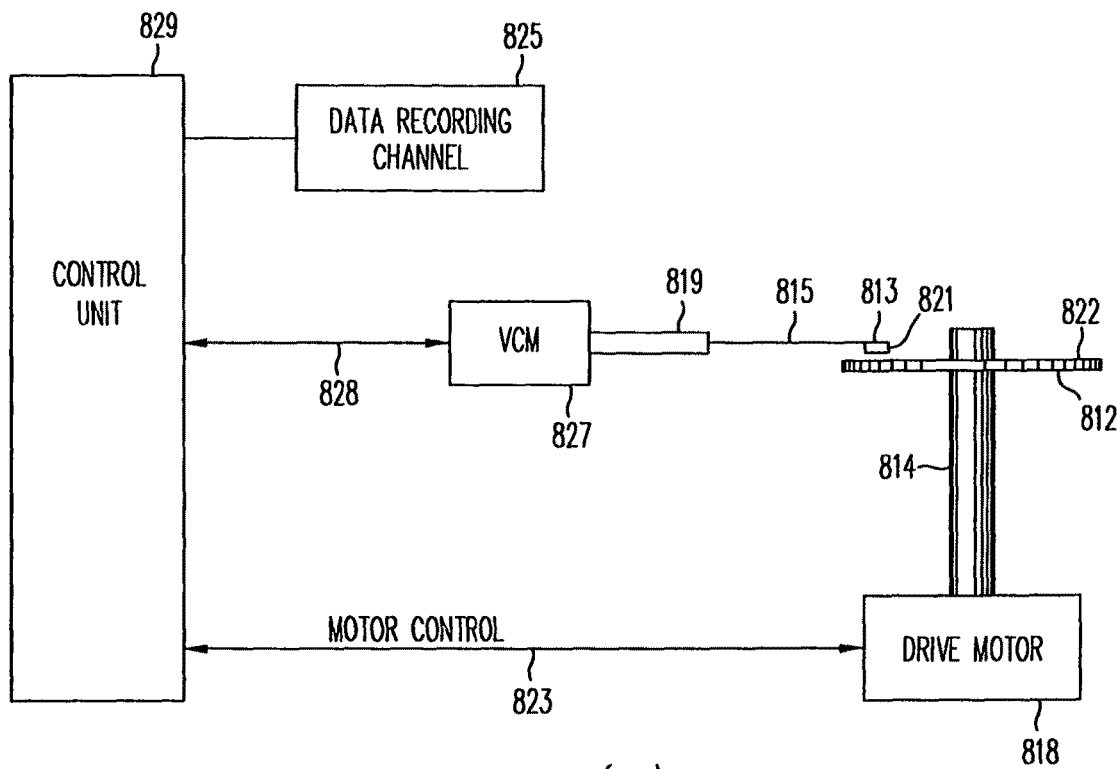
FIG. 8(a) is a hard disk drive including lubricant.
Figure 8B:
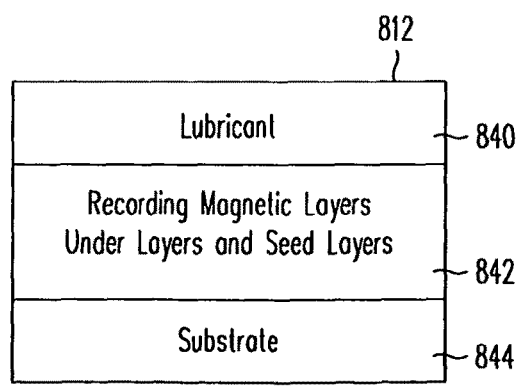
FIG. 8(b) is an illustrative disk in a hard disk drive.

Referring now to FIG. 8(*a*), there is shown a disk drive 800 embodying this invention. As shown in FIG. 8(*a*), at least one rotatable magnetic disk 812 is supported on a spindle 814 and rotated by a disk drive motor 818. The magnetic recording on each disk is in the form of annular patterns of concentric data tracks (not shown) on the magnetic disk 812.

Figure 1B:
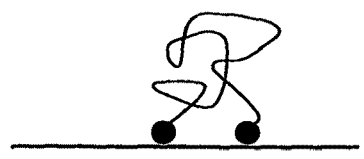
FIG. 1(b) is a high MW lubricant molecule, with low evaporation and low clearance.
Figure 1C:
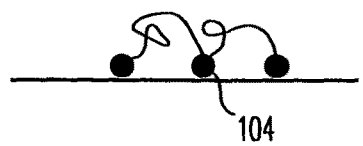
FIG. 1(c) is a lubricant molecule with low evaporation and good clearance properties.

At least one slider 813 is positioned near the magnetic disk 812, each slider 813 supporting one or more magnetic head assemblies 821. As the magnetic disk rotates, slider 813 moves radially in and out over the disk surface 822 so that the magnetic head assembly 821 may access different tracks of the magnetic disk where desired data are written. Each slider 813 is attached to an actuator arm 819 by way of a suspension 815. The suspension 815 provides a slight spring force which biases slider 813 against the disk surface 822. Each actuator arm 819 is attached to an actuator means 827. The actuator means 827 as shown in FIG. 1 may be a voice coil motor (VCM). The VCM comprises a coil movable within a fixed magnetic field, the direction and speed of the coil movements being controlled by the motor current signals supplied by controller 829.

During operation of the disk storage system, the rotation of the magnetic disk 812 generates an air bearing between the slider 813 and the disk surface 822 which exerts an upward force or lift on the slider. The air bearing thus counter-balances the slight spring force of suspension 815 and supports slider 813 off and slightly above the disk surface by a small, substantially constant spacing during normal operation.

The various components of the disk storage system are controlled in operation by control signals generated by control unit 829, such as access control signals and internal clock signals. Typically, the control unit 829 comprises logic control circuits, storage means and a microprocessor. The control unit 829 generates control signals to control various system operations such as drive motor control signals on line 823 and head position and seek control signals on line 828. The control signals on line 828 provide the desired current profiles to optimally move and position slider 813 to the desired data track on disk 812. Write and read signals are communicated to and from write and read heads 821 by way of recording channel 825.

Disk 812 is further shown in FIG. 8(*b*). The disk includes three portions. On the bottom is a substrate 844. Above the substrate 844 are overcoats, magnetic recording layers, under layers and seed layers 842. Above the overcoats, magnetic recording layers, under layers and seed layers 842 is lubricant 840. The lubricant of the present invention may be implemented as layer the lubricant layer 840 for a hard disk drive system.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A hard disk drive including:
   a media lubricated with lubricant molecules including a backbone and a first functional group attached the backbone and a second functional group attached to the backbone, wherein the first functional group and the second functional group are non-terminal OH functional groups; and
   a head to at least one of read data from and write data to the media.

2. The hard disk drive of claim 1, wherein the lubricant molecules include a non-terminal third functional group attached to the backbone.

3. The hard disk drive of claim 2, wherein the lubricant molecules include a non-terminal fourth functional group attached to the backbone.

4. The hard disk drive of claim 1, wherein the lubricant molecules include a terminal third functional group attached to the backbone.

5. The hard disk drive of claim 2, wherein the lubricant molecules include a terminal fourth functional group attached to the backbone.

6. The hard disk drive of claim 5, wherein the lubricant molecules have a molecular weight of less than 2100 AU.

7. The hard disk drive of claim 5, wherein the lubricant molecules have a molecular weight of less than 4000 AU.

8. The hard disk drive of claim 3, wherein the lubricant molecules include a fifth functional group attached to the backbone.

9. The hard disk drive of claim 3, wherein the lubricant molecules include a sixth functional group attached to the backbone.

10. The hard disk drive of claim 5, wherein the lubricant molecules include a fifth functional group attached to the backbone.

11. The hard disk drive of claim 5, wherein the lubricant molecules include a sixth functional group attached to the backbone.

12. The hard disk drive of claim 1, wherein the lubricant molecules include eight functional groups attached to the backbone, wherein
   two functional groups are terminal functional groups at a first end of the lubricant molecule,
   two functional groups are terminal functional groups at a second end of the lubricant molecule and
   four functional groups are non-terminal functional groups.

13. A lubricated media including:
   a lubricant including:
      a backbone and a first functional group attached to the backbone and a second functional group attached to the backbone, wherein the first functional group and the second functional group are non-terminal OH functional groups.

14. The lubricated media of claim 13, wherein the lubricant includes a non-terminal third functional group attached to the backbone.

15. The lubricated media of claim 14, wherein the lubricant includes a non-terminal fourth functional group attached to the backbone.

16. The lubricated media of claim 13, wherein the lubricant include a terminal third functional group attached to the backbone.

17. The lubricated media of claim 14, wherein the lubricant includes a terminal fourth functional group attached to the backbone.

18. The lubricated media of claim 17, wherein the lubricant has a molecular weight of less than 2100 AU.

19. The lubricated media of claim 17, wherein the lubricant has a molecular weight of less than 4000 AU.

20. The lubricated media of claim 15, wherein the lubricant includes a fifth functional group attached to the backbone.

21. The lubricated media of claim 15, wherein the lubricant includes a sixth functional group attached to the backbone.

22. The lubricated media of claim 17, wherein the lubricant includes a fifth functional group attached to the backbone.

23. The lubricated media of claim 17, wherein the lubricant includes a sixth functional group attached to the backbone.

24. The lubricated media of claim 13, wherein the lubricant includes eight functional groups attached to the backbone, wherein
two functional groups are terminal functional groups at a first end of the lubricant molecule,
two functional groups are terminal functional groups at a second end of the lubricant molecule and
four functional groups are non-terminal functional groups.

* * * * *